(12) United States Patent
Sparks

(10) Patent No.: US 8,725,841 B2
(45) Date of Patent: May 13, 2014

(54) PROVIDING DIFFERENT VERSIONS OF A MEDIA FILE

(75) Inventor: David L. Sparks, Cupertino, CA (US)

(73) Assignee: Google Inc., Mountain View, CA (US)

(*) Notice: Subject to any disclaimer, the term of this patent is extended or adjusted under 35 U.S.C. 154(b) by 451 days.

(21) Appl. No.: 13/250,242

(22) Filed: Sep. 30, 2011

(65) Prior Publication Data

US 2012/0124177 A1 May 17, 2012

Related U.S. Application Data

(63) Continuation of application No. 12/946,770, filed on Nov. 15, 2010.

(51) Int. Cl.
*G06F 15/16* (2006.01)

(52) U.S. Cl.
USPC ............ 709/219; 707/695; 707/689; 707/780

(58) Field of Classification Search
None
See application file for complete search history.

(56) References Cited

U.S. PATENT DOCUMENTS

| | | | |
|---|---|---|---|
| 6,044,471 A | 3/2000 | Colvin | |
| 6,327,617 B1 | 12/2001 | Fawcett | |
| 6,760,442 B1* | 7/2004 | Scott | 380/268 |
| 6,785,825 B2* | 8/2004 | Colvin | 726/28 |
| 6,791,579 B2* | 9/2004 | Markel | 715/719 |
| 7,277,928 B2 | 10/2007 | Lennon | |
| 7,346,920 B2* | 3/2008 | Lamkin et al. | 725/112 |
| 7,567,671 B2* | 7/2009 | Gupte | 380/239 |
| 7,568,143 B2* | 7/2009 | Hamzy et al. | 714/746 |
| 7,788,398 B2* | 8/2010 | Chapweske et al. | 709/233 |
| 2001/0042048 A1* | 11/2001 | Boykin et al. | 705/51 |
| 2002/0032905 A1 | 3/2002 | Sherr et al. | |
| 2002/0049717 A1* | 4/2002 | Routtenberg et al. | 707/1 |
| 2004/0024688 A1* | 2/2004 | Bi et al. | 705/37 |
| 2004/0093396 A1 | 5/2004 | Akune | |
| 2004/0199387 A1 | 10/2004 | Wang et al. | |
| 2005/0119977 A1 | 6/2005 | Raciborski | |
| 2006/0031749 A1* | 2/2006 | Schramm et al. | 715/500.1 |
| 2006/0032905 A1 | 2/2006 | Bear et al. | |
| 2006/0195881 A1* | 8/2006 | Segev et al. | 725/116 |
| 2006/0235723 A1 | 10/2006 | Millard | |
| 2007/0027831 A1* | 2/2007 | Bucher et al. | 707/1 |
| 2007/0192352 A1 | 8/2007 | Levy | |
| 2007/0203945 A1 | 8/2007 | Louw | |
| 2008/0141317 A1* | 6/2008 | Radloff et al. | 725/87 |

(Continued)

OTHER PUBLICATIONS http://www.eurogamer.net/articles/microsoft-patents-xbox-live-upsell-idea Title: "Microsoft patents Xbox Live upsell idea" Filename: Microsoft patents Xbox Live upsell idea Xbox 360 News—p. 1 Eurogamer_net.mht, published Mar. 15, 2010.

(Continued)

*Primary Examiner* — Greg C Bengzon

(74) *Attorney, Agent, or Firm* — Fish & Richardson P.C.

(57) ABSTRACT

Data indicates characteristics of a user's multiple media files. The multiple media files are associated with a media library. At least one of the multiple media files matches content in a master media file. The content in the matching media file is of a quality that is lower than the quality of the master media file. The user can provide payment for access to the master media file and, if the user does so, the master media file is associated with the media library and the user is provided with access to the master media file.

24 Claims, 5 Drawing Sheets

(56) References Cited

U.S. PATENT DOCUMENTS

| | | | |
|---|---|---|---|
| 2008/0294453 A1 | 11/2008 | Baird-Smith et al. | |
| 2009/0055510 A1* | 2/2009 | Svendsen | 709/217 |
| 2009/0187957 A1* | 7/2009 | Avkarogullari | 725/109 |
| 2010/0056268 A1 | 3/2010 | Langan et al. | |
| 2010/0169222 A1 | 7/2010 | Qawami et al. | |
| 2010/0185673 A1* | 7/2010 | Toebes et al. | 707/780 |
| 2011/0135283 A1* | 6/2011 | Poniatowki et al. | 386/297 |
| 2011/0137976 A1* | 6/2011 | Poniatowski et al. | 709/203 |
| 2011/0138412 A1* | 6/2011 | Roberts et al. | 725/34 |
| 2011/0176496 A1* | 7/2011 | Roy et al. | 370/329 |
| 2011/0288970 A1 | 11/2011 | Kidron et al. | |
| 2012/0078997 A1 | 3/2012 | Evans et al. | |

OTHER PUBLICATIONS http://www.digidaydaily.com/stories/digital-content-today-music-still-drives-itunes/ Title: "Digital Content Today: Music Still Drives iTunes" Filename: Digidaydaily—Digital Content Today Music Still Drives iTunes.mht—2 pages, published Aug. 31, 2010.

http://www.nytimes.com/2009/04/05/fashion/05iphone.html?pagewanted=all Title: "The iPhone Gold Rush" Filename: TheiPhoneGoldrush.pdf—5 pages, published Apr. 5, 2009.

Written Opinion of the International Searching Authority issued in PCT/US2011/60607 on Mar. 28, 2012, 7 pages.

International Search Report issued in PCT/US2011/60607 on Mar. 28, 2012, 2 pages.

Office Action issued in U.S. Appl. No. 12/946,770 on Jan. 16, 2013, 30 pages.

Office Action issued in U.S. Appl. No. 12/946,770 on Jun. 17, 2013, 19 pages.

International Preliminary Report on Patentablity issued in PCT/US2011/060607 on May 30, 2013, 9 pages.

Office Action for U.S. Appl. No. 12/946,770 dated Jan. 16, 2013, 30 pages.

* cited by examiner

Variations of Media Content Quality

|  | Low Quality Level | High Quality Level |
|---|---|---|
| _302a_<br>Length | _302b_<br>A (B) C (B) D (B) | _302c_<br>A (B) (B) C (B) D (B) (B) E (B) (B) |
| _304a_<br>Metadata | _304b_<br>* Artist Name<br>* Song Name<br>* Album Name | _304c_<br>* Artist Name  * Distributor<br>* Song Name  * A capella version<br>* Album Name  * Instrumental version<br>* Artwork<br>* Lyrics<br>* Website |
| _306a_<br>Bit rate | _306b_<br>128 kbps | _306c_<br>192 kbps |
| _308a_<br>Codec / File Type | _308b_<br>Codec A | _308c_<br>Uncompressed |
| _310a_<br>Defects | _310b_ | _310c_ |

FIG. 3

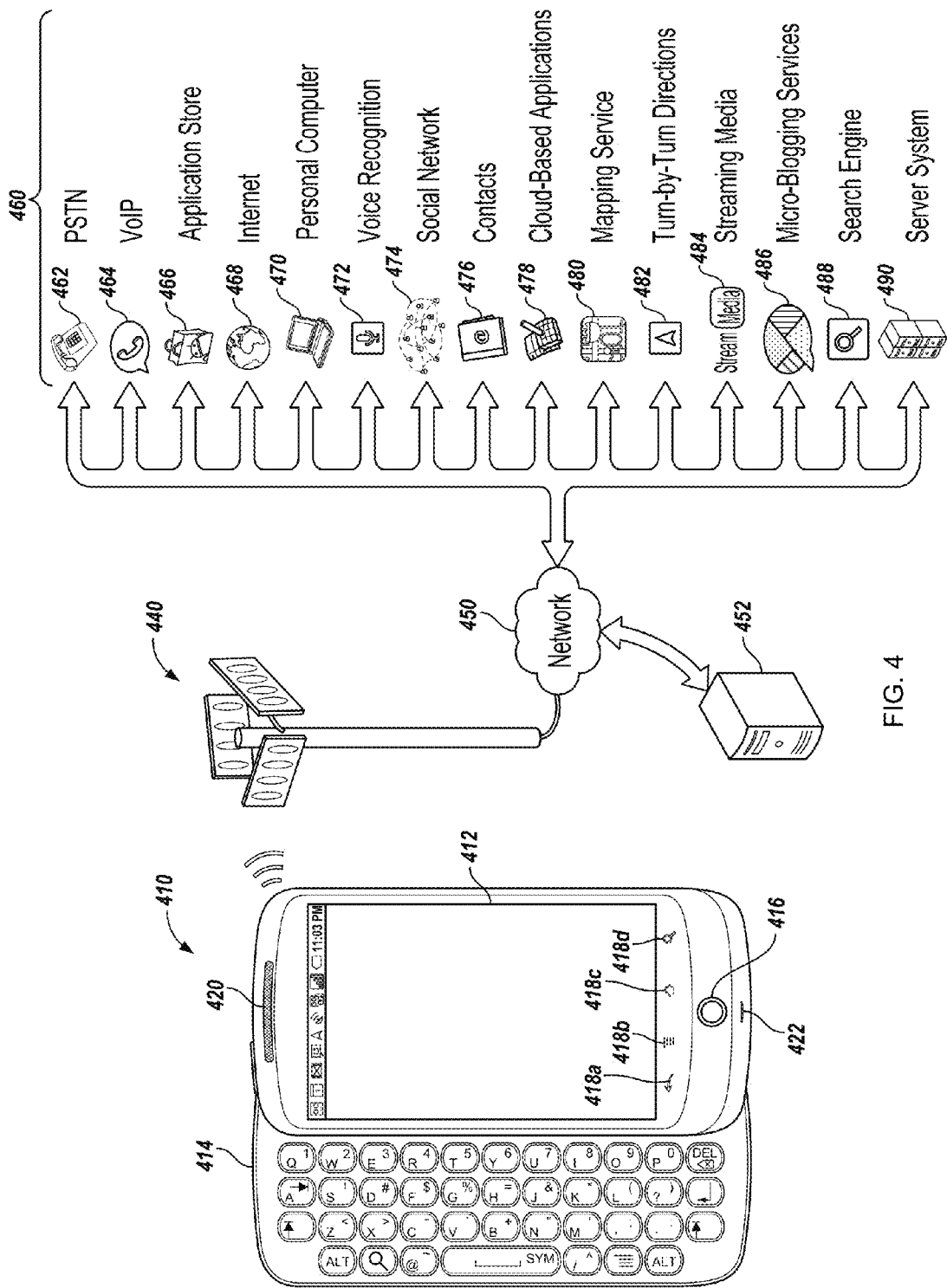

PROVIDING DIFFERENT VERSIONS OF A MEDIA FILE

CLAIM OF PRIORITY

This application is a continuation application of U.S. patent application Ser. No. 12/946,770, filed on Nov. 15, 2010, the entire contents of which are hereby incorporated by reference in its entirety.

TECHNICAL FIELD

This document generally relates to media files.

BACKGROUND

Consumers of media (e.g., music and video) increasingly store their media collections as files that are locally-accessible on a computing device, instead of on compact discs (CDs), digital video discs (DVDs), or tapes. The consumers may obtain the media files by ripping music and video files from CDs and DVDs, or by downloading the media files from online media stores.

SUMMARY

In general, one aspect of the subject matter described in this specification can be embodied in a computer-implemented method for storing media files. The method includes storing, at a server system, a master media file, the master media file containing content at a first quality level. The method includes accessing, by the server system, characteristic data that indicates characteristics of multiple media files that are stored for a user on a user device, where the characteristic data is generated based on a scan of the multiple media files that was conducted to determine media files to be associated with a media library stored at the server system for the user. The method includes associating, at the server system, the multiple media files with the media library. The method includes determining, at the server system and based on the characteristic data, that at least one of the multiple media files is a matching media file that includes content matching the content contained in the master media file. The method includes determining, at the server system that the content contained in the matching media file is of a second quality level that is lower than the first quality level of the content contained in the master media file. The method includes determining if the user has provided payment for access to the master media file. The method includes, if the user has provided payment for access to the matching media file, associating the master media file with the media library and providing the user with access to the matching media file stored at the server system.

This and other aspects can optionally include one or more of the following features. Providing the user with access to the matching media file stored at the server system may include receiving, at the server system, a request from the user device to download the master media file to the user device and, in response to receiving the request, sending the master media file to the user device. Providing the user with access to the matching media file stored at the server system may include receiving, at the server system, a request from the user device to stream the master media file to the user device and, in response to receiving the request, streaming the master media file to the user device. Determining if the user has provided payment for access to the master media file may include determining if the user has provided payment as part of a subscription that provides access to master media files. The method may include, in response to determining that the content contained in the matching media file is of a second quality level that is lower than the first quality level of the content contained in the master media file, causing the user device to display a prompt to the user, the prompt soliciting the user for payment to receive access to the master media file. The accessed characteristic data may be generated by the user device. The accessed characteristic data may include acoustic fingerprints of the multiple media files, wherein an acoustic fingerprint is a digital summary of a media file that has been deterministically generated from an audio signal that is stored within the media file. Determining that at least one of the multiple media files is a matching media file may include determining that an acoustic fingerprint of the matching media file matches an acoustic fingerprint of the master media file. The accessed characteristic data may be generated by the server system. The accessed characteristic data may include metadata that specifies information for the multiple media files. The information may include one or more of title, artist, album or bitrate. Determining that the content contained in the matching media file is of a second quality level that is lower than the first quality level of the content contained in the master media file may include determining that the matching media file encodes an audio signal at a lower bit rate than the master media file. Determining that the content contained in the matching media file is of a second quality level that is lower than the first quality level of the content contained in the master media file may include determining that the matching media file encodes an audio signal at a same bit rate as the master media file but that the master media file includes fewer defects in the audio signal that are caused during an encoding process for the audio signal than the matching media file. Determining that the content contained in the matching media file is of a second quality level that is lower than the first quality level of the content contained in the master media file includes determining that the master media file is a longer length version of the matching media file.

In another aspect, a system includes a user device and a server system. The user device stores multiple media files for a user. The server system is configured to store a master media file, the master media file containing content at a first quality level; access characteristic data that indicates characteristics of the multiple media files, wherein the characteristic data is generated based on a scan of the multiple media files that was conducted to determine media files to be associated with a media library stored at the server system for the user; associate the multiple media files with the media library; determine, based on the characteristic data, that at least one of the multiple media files is a matching media file that includes content matching the content contained in the master media file; determine that the content contained in the matching media file is of a second quality level that is lower than the first quality level of the content contained in the master media file; determine if the user has provided payment for access to the master media file; and if the user has provided payment for access to the master media file, associate the master media file with the media library and providing the user with access to the master media file stored at the server system.

This aspect and other aspects may include one or more of the following features. For example, to determine if the user has provided payment for access to the master media file, the server system may be configured to determine if the user has provided payment as part of a subscription that provides access to master media files. The server system may be further configured to, in response to determining that the content contained in the matching media file is of a second quality level that is lower than the first quality level of the content contained in the master media file, cause the user device to display a prompt to the user, the prompt soliciting the user for payment to receive access to the master media file.

In another aspect, a computer readable medium storing instructions that, when executed by one or more processing devices, cause the one or more processing devices to store, at a server system, a master media file, the master media file containing content at a first quality level; access, by the server system, characteristic data that indicates characteristics of multiple media files that are stored for a user on a user device, wherein the characteristic data is generated based on a scan of the multiple media files that was conducted to determine media files to be associated with a media library stored at the server system for the user; associate, at the server system, the multiple media files with the media library; determine, at the server system and based on the characteristic data, that at least one of the multiple media files is a matching media file that includes content matching the content contained in the master media file; determine, at the server system, that the content contained in the matching media file is of a second quality level that is lower than the first quality level of the content contained in the master media file; determine if the user has provided payment for access to the master media file; and if the user has provided payment for access to the master media file, associate the master media file with the media library and providing the user with access to the master media file stored at the server system.

This aspect and other aspects may include one or more of the following features. For example, to determine if the user has provided payment for access to the master media file, the instructions may include instructions that cause the one or more processing devices to determine if the user has provided payment as part of a subscription that provides access to master media files. The instructions may include instructions that cause the one or more processing devices to, in response to determining that the content contained in the matching media file is of a second quality level that is lower than the first quality level of the content contained in the master media file, cause the user device to display a prompt to the user, the prompt soliciting the user for payment to receive access to the master media file.

Particular embodiments can be implemented, in certain instances, to realize one or more of the following advantages. A user may upgrade the quality of media files he or she already owns. The user may do so without having to pay the full price for a newer version of a media file. The user can purchase, at a reduced rate, a newer, higher quality version of the media file as an upgrade as they already have paid for the rights to own the media file. The higher quality version may enhance the user's viewing and listening pleasure on their user device.

The details of one or more implementations are set forth in the accompanying drawings and the description below. Other features, objects, and advantages will be apparent from the description and drawings, and from the claims.

DESCRIPTION OF DRAWINGS

FIG. 3 illustrates examples of variations in media content quality level.

FIG. 4 is a diagram showing an example of a system that may be used to implement the systems and methods described in this document.

Like reference symbols in the various drawings indicate like elements.

DETAILED DESCRIPTION

Figure 1:
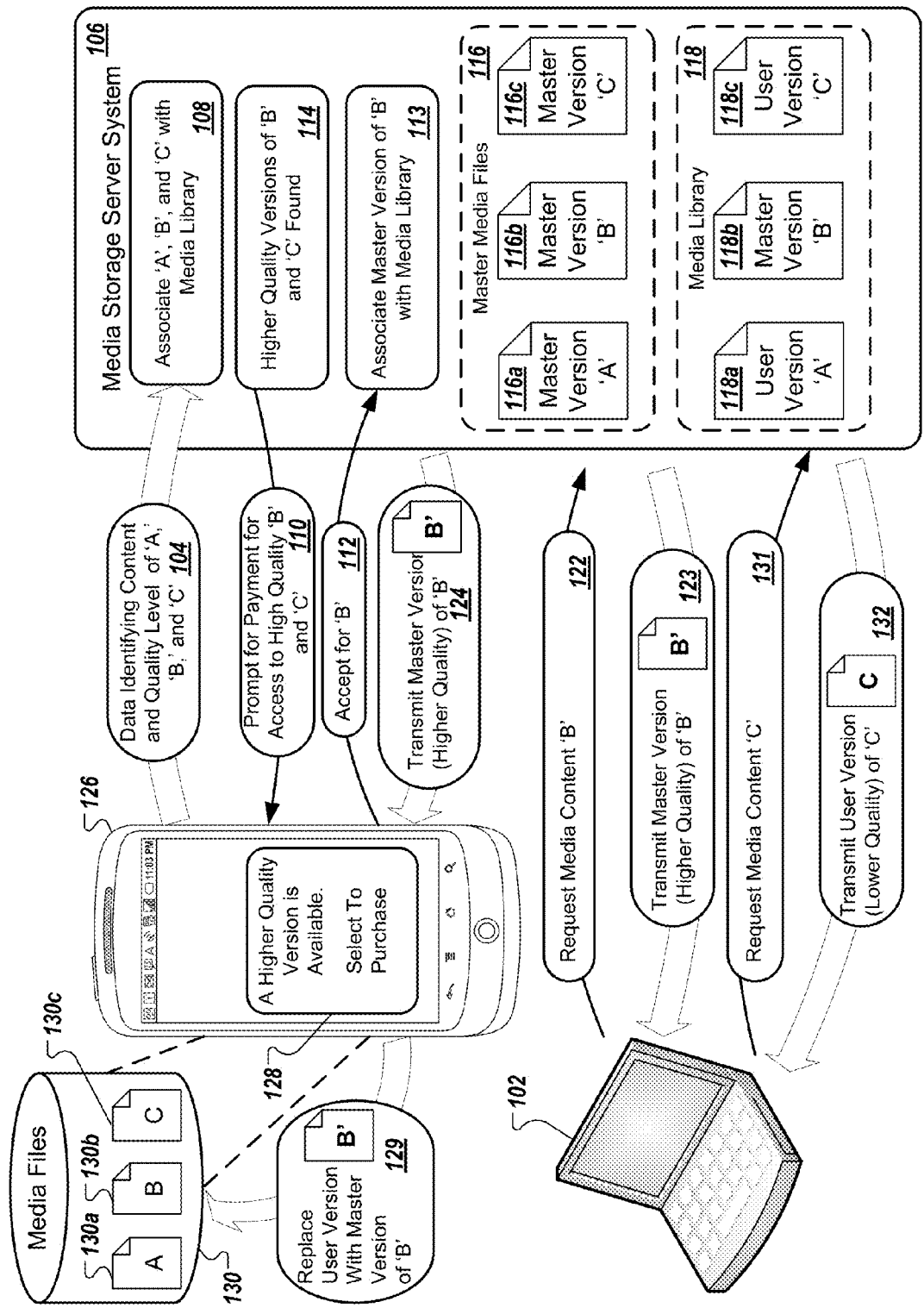
FIG. 1 illustrates an example of a process and system for performing media file storage and upselling.

This document generally describes a system for providing media file identification, storage and retrieval. For example, a service provider can provide a media storage service over a network and a subscriber of the service provider who is a user of the service may upload their media collections to a server system that is accessible over the network. In addition, the user may download or stream media files stored on the server system to their computing devices. In some cases, the user may add a downloaded media file to their media collection for a fee, payable to the provider of the media file. A user's media collection can include, but is not limited to, songs and videos (e.g., movies).

In some cases, a media file that includes media content that is of higher quality than the content of the media file currently included in the user's media collection may be stored on the server system. For example, the media file included in the user's media collection may include content that originated from a low quality source. For example, a song may have originated from an audio cassette or a vinyl album and a higher quality digitally restored version of the same song is stored on the system server. In another example, a video of a movie may have originated from a videocassette tape and a higher quality version of the same movie that may have been provided on a Digital Video Disc (DVD) or Blu-Ray Disc is stored on the system server.

The system server offers the higher quality version of the same media file currently included in the user's media collection to the user. The media file that includes higher quality media content may be offered to the user as a replacement for the lower quality version of the media file, or as an addition to the lower quality version. For example, the system server may offer the higher quality version of the media file to the user for a fee (e.g., upselling of the media file). In another example, a subscription service may be provided. This may include a service contract between the service provider and the user that allows the user to pay a fee on a regular basis for a predetermined or unlimited number of media file upgrades. In upgrading, a lower quality version of a media file is replaced by a higher quality version of the media file stored on the server system. Thus, in some implementations, the server system determines if the user has provided payment for access to the higher quality version (for example, as a single fee or subscription) and, if the user has provided payment for access to the higher quality version, the server system associates the higher quality version with a media library of the user and provides the user with access to the higher quality version. The higher quality version of the media file can, in certain instances, enhance the user's listening and/or viewing pleasure.

In some examples, the media file that contains the low quality level version of media content may include similar content and audio-visual quality level as the content in the higher quality media file (e.g., the content may be encoded with a same bit rate and stored with a same file type), but the low quality level version of the media content may be a shorter length than the high quality level version of the media content. In other words, the low quality level media content may be a subset of the high quality level media content.

In some examples, the low quality level version of the media content includes defects that may not be found in the high quality level version of media content. In some examples, a low quality level version of the media content includes a subset of types of media content included in a high quality level version of the media content. For example, the low quality level version may include only audio, where the high quality level content may include audio and video. As another example, the low quality version may be in lossy audio compression format, while the higher quality version may be in a non-lossy compression format.

FIG. 1 illustrates an example of a process and system for performing media file storage and upselling. Referring to FIG. 1, a user device 126 includes local, non-networked memory that includes a media collection 130 that further includes three media files 130a-c. A media file may be a file that digitally represents media content (e.g., any combination of audible sound, video, or images). For example, a media file may store a digital representation of music in an MP3 file format, a digital representation of a video in an AVI file format, or a digital representation of an image in a JPG format. In some cases, the media files 130a-c may include contents of songs or video content presently owned by the user. For example, a user may copy the contents of a vinyl album to their computer. In another example, a user may copy the contents of a video tape to their computer. In some cases, the media files 130a-c may be purchased from physical retailers or online retailers. For example, a user may drive to a music store, purchase a CD music album, and copy the contents of the CD to their computer. Similarly, the user may visit an online website for a music store by visiting a website, searching for a music artist, and selecting a link to download a music file that is displayed in response to the search.

Although three media files 130a-c are illustrated in FIG. 1, the number of media files in a user's media collection 130 may be in the thousands, and may occupy significant storage space. The media collection 130 may have taken significant time commitment to gather and may have cost substantial sums of money. Accordingly, a user may want to access the media collection 130 on multiple devices, and may want to ensure that they do not lose their music collection. Thus, the user may upload their media collection 130 to a "cloud" (e.g., an internet-based media storage service that is hosted over a server system). In addition, in some implementations, the user device 126 may not include sufficient local, non-networked memory to store the user's entire media collection 130. This may be due to the number of files in the media collection 130 as well as the physical size of each file. Thus, the user may upload their media collection 130 to the cloud and may periodically update their media collection 130 with any locally stored media files not included in the stored media collection 130. In addition, for example, the user may replace media files in their media collection 130 with different versions of the media file.

In some implementations, the user of the user device 126 uploads media files 130a-c by visiting a website that is hosted by the media storage service. For example, at the website, the user may select a link that causes a dialog box to appear on a display 127 of the user device 126 for specifying files that can be uploaded to the media storage service. The user may specify particular media files, media file types, or directories of media files that the user would like to upload to the media storage service. In another example, the user launches an application program that is hosted locally on the user device 126, and the application program searches the user device 126 for files to upload to the media storage service. In another example, the user launches an application program that is for the media storage service. The application program may allow the user device 126 to push its media collection to the cloud, or otherwise synchronize its media collection with the media collection that is stored in the cloud.

The user device 126 may collect or generate data that identifies the media files 130a-c and that identifies the quality level of each of the media files by performing a scan of the media files 130a-c included in the media collection 130. The data that is transmitted for a particular media file may include any appropriate combination of, for example: (i) size of the media file (e.g., 3.4 megabytes), (ii) a file format (e.g., MP3), (iii) a codec, (iv) a bit rate (e.g., 224 kbits/s), (v) a fingerprint (e.g., an acoustic fingerprint), (vi) timed length, and (vii) media content metadata. A file format may define the type of one or more layers of audio and/or video data that are contained within the file. A codec may be used to encode and decode the raw audio and/or video data that can be stored within a media file. The bit rate generally refers to the amount of information, or detail that is stored per unit of time of a recording.

A fingerprint may be a condensed digital summary that is deterministically generated from the content in a media file. For example, an acoustic fingerprint may be deterministically generated from an audio signal stored in an audio file, and may potentially be used to quickly locate audio files of similar content in a database. An acoustic fingerprint may not be a bitwise fingerprint, as two songs that sound the same and have the same pitch may not be a straight binary match. The acoustic fingerprint may be generated by performing a fast Fourier transform on the media file. In various examples, the acoustic fingerprint is not generated using textual metadata that is stored for the media content stored in the file. Similar mechanisms may be performed to generate a fingerprint from a video file. In various examples, an acoustic and visual fingerprint may be generated for a video file that includes audio and video content.

Metadata may be textual data that describes the media content in the media file. The metadata may be included as part of the media file. Accordingly, the media file may include a content portion (e.g., encoded audio and video) and a metadata portion (e.g., text that describes the content). Portions of the metadata may be accompanied by data elements that define a context for each of the portions of metadata. In some implementations, metadata defines associated musical content (e.g., a name of the musical song, a name of the artist of the song, a name of the album, an image file of the cover art for the album, song lyrics, a length of the song, and a genre of the song).

The description with reference to FIG. 1 continues with reference to media files that include musical content, as an illustration, although the description may apply to media files that include other types of media content (e.g., video content). In this example, media files 130a-c include musical content. For example, a user requests that the user device 126 play the song "B" in the media file 130b. Because of this action, the user device 126 analyzes the media files 130a-c included in its media collection 130 and sends data 104 that identifies the content and quality level of the media collection 130 to a media storage server system 106. In some implementations, the user device 126 analyses only the media file 130b selected by the user and sends the data for the single media file 130b to the server system 106. In some implementations, the user device 126 analyses the media files 130a-c included in its media collection 130 at a regularly scheduled time (e.g., once per day, once per week) and sends the data for the media collection 130 to the server system 106.

The server system 106 associates (in box 108) media files 130*a-c* with the media library 118 and determines whether the content of the media files 130*a-c* in the media collection 130 includes content that matches the content of master media files 116*a-c*, respectively, included in master media files 116 at the server system 106. In the example shown in FIG. 1, the server system 106 identifies master versions of media files 130*a-c*, master media files 116*a-c*, respectively. For example, to be described with reference to FIG. 2, the server system 106 accesses master media files stored in the master media files 116 that can be included in a master media file repository and identifies the master media files 116*a-c*. In some implementations, the server system 106 may not identify master versions of one or more (or all) of the media files 130*a-c*.

The server system 106 determines, based on the characteristic data identifying the content and quality level of the media files 130*a-c* uploaded to the server system 106, whether any of the media files 130*a-c* includes content that matches the content of one or more of the master media files 116 and, if so, whether any of those matching media files contain the content at a lower quality level than the content in the master media files 116. In some implementations, the process of uploading may include providing the server system 106 with data identifying the content and quality level of each media file along with the media content for each media file included in a media collection. The uploading of the identification data along with the media content can enable the server system 106 to transmit the content of the media collection to another computing device.

In some implementations, the user device 126 may transmit the characteristics for each of the songs in the media collection 130 to the media storage server system 106. In some implementations, the media file that includes the song itself is transmitted to the server system 106 and the server system 106 extracts the characteristics (e.g., content identifying and quality identifying characteristics). In either event, the server system 106 receives the characteristics for each of the songs and performs a process to identify matching songs at the server system 106. Matching songs can be identified as media content within master media files 116*a-c* that are stored by the server system 106.

The server system 106 may not identify a master media file with matching content to the uploaded media file. In this case, the user of the user device 126 can continue to play the media file on the user device 126 and may not be prompted to purchase a higher quality version of the media file. In alternative cases, an uploaded media file can include content that matches the content of a master media file. The uploaded media file can then be referred to as a matching media file. The content of the matching media file may be of a higher quality level than the content of the master media file. In this case, the user of the user device 126 can continue to play the media file on the user device 126 and may not be prompted to purchase a higher quality version of the media file. In another case, the content of the matching media file may be of a lower quality level than the content of the master media file. In this case, the server system 106 may notify the user of the user device 126 of the higher quality version of the media file by having the user device 126 display a prompt to the user that solicits the user for payment to receive access to the identified higher quality version of the media file. The user device 126 may include a graphical interface element 128 that includes a prompt encouraging the user to download or otherwise access the higher quality level version.

In the example shown in FIG. 1, the server system 106 determines (at box 114) that certain master media files 116*b* and 116*c* include higher quality versions of the content in the user media files 130*b* and 130*c*, respectively. The server system 106 notifies the user (at box 110) by prompting the user for payment in order to access master versions of media files 130*b-c*. In other words, the user is prompted for payment to access master media files 116*b* and 116*c* to the user device 126 for storage in the media collection 130. For example, the user device 126 displays the graphical interface element 128 that includes a prompt notifying the user that a higher quality version of the song "B" (e.g., the song represented by the contents of media file 130*b*) is available for purchase. In some implementations, though a higher quality version of the media file 130*b* is identified along with the higher quality version of media file 130*c*, the user may only be prompted to purchase the higher quality version of media file 130*b*. In some implementations, the user may be prompted with a list of media files for purchase identified as having higher quality content as compared to the media files in the user's media collection. When prompted, the user may select to purchase each higher quality media file on an individual basis.

In the example of FIG. 1, the user selects to purchase the higher quality version of the media file 130*b* (in box 112). In some implementations, the user may be charged an upgrade fee for the purchase of the higher quality version, where the upgrade fee is less than the amount that could be charged for an initial purchase of the media file. In some implementations, the media storage service may charge the user's account with the fee, which the user can pay along with other additional fees when the user pays his monthly bill. In some implementations, the media storage service can charge the user a one-time fee that the user can have the media storage service charge to a user provided credit card. In some implementations, the user may subscribe to an upselling service that allows the user a predetermined or unlimited number of upgrades for a monthly service fee. In this case, the user may not need to provide payment information to the media storage service. In some implementations, the amount charged per upgrade can vary depending on the number of upgrades selected by the user at a given point in time. For example, if the user selects to upgrade both media file 130*b* and media file 130*c* at the same point in time, the cost per media file upgrade may be discounted if two or more media files are upgraded at the same time.

In some implementations, the server system 106 may forward the user device's request to a third-party service (e.g., an online media store). In some examples, there may be more than one master version of a give media file (either previously stored or capable of being generated), with each master versions having a different quality level. In response to the request, the user device 126 displays an interface for selecting a quality level of the media file to purchase (e.g., which of multiple bit rates of the song to purchase) and the selected version will be the one associated with the user's media library 118.

The server system 106 then determines that the user has paid for access to the higher quality version and associates (in box 113) the master media file 116*b* included in the master media files 116 with the media library 118 as media file 118*b*. Media files 130*a* and 130*b* were associated with the media library 118 as media files 118*a* and 118*c*, respectively. The server system 106 then transmits (e.g., downloads) (in box 124) the higher quality version of the media file 130*b*, media file 118*b*, to the user device 126. The user device 126 can play the media file 118*b* and can replace (in box 129) the media file 130*b* with the media file 118*b* in the media collection 130. The media file 118*b*, purchased by the user and downloaded from the server system 106 to the user device 126, is a higher quality version of the media file 130b.

The server system 106 may determine that an uploaded media file includes musical content that matches the content in a master media file if a fingerprint for a portion of the uploaded musical content is found to match a fingerprint for a portion of the content in the master media file. In some examples, all portions of the uploaded musical content may need to match portions of the content in a master media file for there to be a match, however, all portions of the content in the master media file may need not match the content in the uploaded media file. In other words, the uploaded media content may be a subset of the content that is stored by the master media file (e.g., where the content in the master media file may include an additional verse that is not in the uploaded musical content).

In some examples, the server system 106 determines that media content that has been uploaded matches the content in a master media file if the metadata, or portions thereof, that is associated with the content matches. For example, if an artist name and a song name for a song in an uploaded media file are the same as or similar to the artist name and song name for a master media file, then the songs may match. Similarly, if the songs are determined to be from the same album, have similar lyrics, or share artwork, there may be an increased chance that the songs are a match. In some examples, uploaded media content is determined to match a master media file based on a combination of matching metadata and matching musical content (e.g., based on acoustic fingerprints).

In some implementations, if an uploaded media file includes media content that is determined to not have matching media content at the server system 106, the uploaded media file may be stored at the server system 106, included in the media library and designated as a master media file for the media content (and may be stored with other master media files 116). Thus, should another user of the media storage service upload the same media content (but possibly with a different quality level), the server system may identify that a matching song exists.

Once a match has been identified, the server system 106 determines a "quality level" of the content in the uploaded media file with respect to the content in the respective master media file. Effectively, the server system 106 determines whether the content in the media file that is being uploaded is of a higher quality level than the content in the master media file that is presently stored at the server system. Media content quality level may be determined based on any combination and weighting of: (i) bit rate of the file that includes the media content, (ii) a format of the file that includes the media content, (iii) a played length of the media content, and (iv) and defects in the media content. For example, a first song may be determined to be of higher quality level than a second song if a bit rate of the first song is higher than a bit rate of the second song, all other quality characteristics being equal. File formats may have a predetermined ranking, for example, where uncompressed audio formats (e.g., WAV and AIFF) are considered to be of higher quality level than lossless compressed audio formats (e.g., FLAC or ALAC), which may be considered of higher quality level than lossy compressed file formats (e.g., MP3 and WMA).

In various examples, a temporal length of the media content, as played to a user, may be used as an indication of media content "quality level." For example, a highest quality level album version of a song may include multiple repeats of a chorus and five different verses. A lower quality level radio version of the song may include only three verses and a single repeat of the chorus for each verse. An even lower quality level version of the song may be a ringtone that includes a short snippet of the chorus from a middle portion of the higher quality level album version (where the snippet may be denoted by a start playing time and an end playing time of the album version of the song).

In various examples, a higher quality level version of media content may be media content that includes fewer defects than other media content, even if other factors, such as bit rate, are the same. For example, media content may include skips, pops or other problems that may result from corrupted portions of the file or defects in the source (e.g., the CD from which the media content was recorded may have been scratched).

A user may later access media files that the user has "uploaded" to the media storage service using the cloud, either using the device at which the songs were uploaded (in this example, user device 126), or another device (for example, computing device 102). For example, a user of the computing device 126 may have uploaded his media collection 130 when the user was logged into the media storage service with login credentials (e.g., a username and password). The same user may later log into the media storage service using the same login credentials, but with a different device (e.g., computing device 102), and download all, or user-specified portions, of the stored media.

For example, the user may be using computing device 102 that does not have the media files 130a-c stored locally on the computing device 102 (e.g., the computing device is a laptop computer the user uses for business purposes). The user may access the media files 130a-c on the computing device 102 using an application program that the user has downloaded to the computing device 102. The application program may allow the user to browse his media collection 118, which has been uploaded to the server system 106, and download or stream select media files to the computing device 102.

For example, the user may request that the computing device 102 play the media file 130b (song "B"). The computing device 102 does not have the media file 130b stored locally on the computing device 102. The computing device 102 can request the server system 106 to stream (or download) the media content of the media file 130b from the server system 106 to the computing device 102 (box 122). The server system 106 receives the request, and in response the server system 106 transmits (for example, by streaming or downloading) the higher quality version of the media file 130b (media file 118b) to the computing device 102 (box 123) as the user previously purchased the higher quality version of the media file 130b (media file 118b) to include in their media collection 130. The computing device 102 may display a user interface to the user for playing the song. Although not illustrated in FIG. 1, the interface may include controls for pausing the song, restarting the song, skipping the song, and browsing the other media files that are stored for the user by the media storage service provided by the server system 106.

For example, the user may request that the computing device 102 play the media file 130c (song "C"). The computing device 102 does not have the media file 130c stored locally on the computing device 102. The computing device 102 can request the server system 106 to stream the media content of the media file 130c from the server system 106 to the computing device 102 (box 131). The server system 106 receives the request, and in response the server system 106 transmits the lower quality version of the media file 130c (media file 118a) to the computing device 102 (box 132) as the user previously elected not to purchase the higher quality version of the media file 130c. Therefore, the higher quality version of the media file 130c, (master version 116c) is not include in the user's media collection 130.

Figure 2:
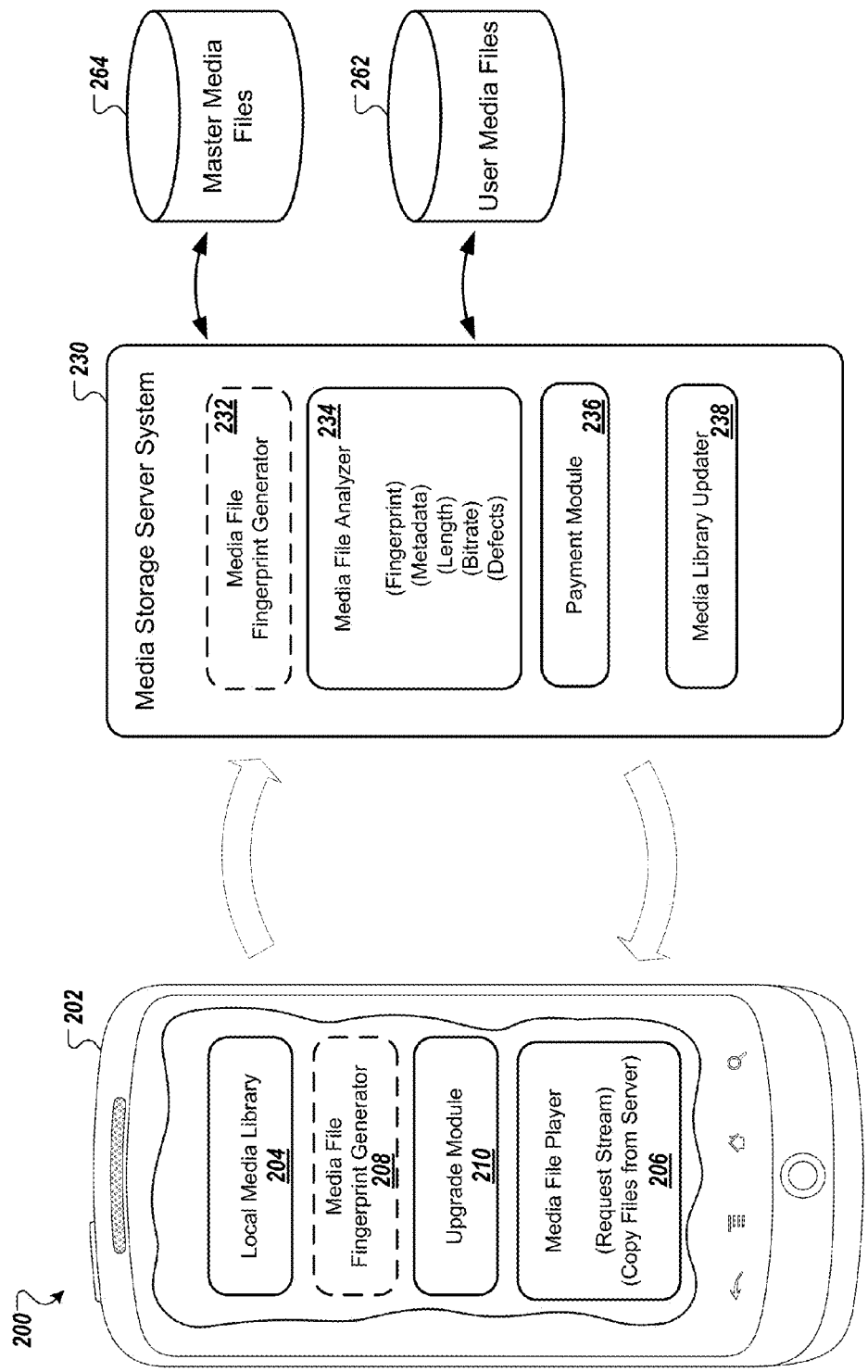
FIG. 2 illustrates an example of a system for performing media file storage and upselling.

FIG. 2 is an example system 200 for performing media file storage and upselling. The system 200 includes a mobile computing device 202 with a local media library 204 and a media file player 206. The mobile computing device 202 communicates with a media storage server system 230. An example of the mobile computing device 202 can be the user device 126 in FIG. 1. An example of the media storage server system 230 can be the media storage server system 106 in FIG. 1. The media storage server system 230 includes a media file analyzer 234 that compares the content of media files that have been uploaded to the server system 230 to master media files that are stored in a master media file repository 264.

The local media library 204 includes a collection of data files, where each data file may include content (e.g., digitally encoded audio, video, and/or pictures), and metadata that identifies information about the media content. For example, referring to FIG. 1, the local media library 204 may include media files 130a-c. A user of the mobile computing device 202 may request that the device upload the media library 204 (or portions thereof) to the media storage server system 230. In response, the mobile computing device 202 may transmit to the server system 230 either (i) the files in the media library, or (ii) information that identifies characteristics of the files (e.g., the metadata and media file fingerprints, but not the media content itself).

In some implementations, the mobile computing device 202 transmits the media file fingerprint to the server system 230 where a media file fingerprint generator 208 located at the mobile computing device 202 generates the media file fingerprint. In some implementations, the mobile computing device 202 transmits the media file to the server system 230 where a media file fingerprint generator 232 located at the server system 230 generates the media file fingerprint. The operation of the media file fingerprint generator was discussed earlier in this document with reference to the generation of acoustic fingerprints.

In either event, the server system 230 receives information that identifies the characteristics of the local media library 204 either as determined by the mobile computing device 202 or by the server system 230. In response, the media file analyzer 234 analyzes the uploaded media content to determine if matching media content is stored at the server system 230 (e.g., whether any of the master media files stored in the repository 264 include matching media content to the uploaded media content). The media file analyzer 234 compares content in an uploaded media file to the content of a master media file. The comparison may evaluate in each of the two media files combinations of, for example: media file fingerprints, metadata, media playing length, bit rate, and media defects. Through such comparisons, the media file analyzer 234 may identify master media files that match uploaded media files.

If the uploaded media file is of a lower quality level than a matching master media file (as described throughout this document), a payment module 236 included in the server system 230 notifies the user regarding the availability of the higher quality version of the uploaded media file (the master media file or files) and provides the cost of upgrading the media file to the user.

The upgrade module 210 included in the mobile computing device 202 can display an interface to the user to allow the user to select the media file for upgrading and to provide, if needed, payment information. If the user decides to upgrade the uploaded media file, the master media file is associated with the user's media library by the media library updater 238. A media library updater 238 transmits the higher quality media file to the mobile computing device 202 for storage (e.g., it can replace the existing matching media file or be stored together with the matching media file) in the local media library 204 or for temporary buffering as a streamed media file.

Additionally, the server system 230 may host an internet-based media storage service that allows the user of the mobile computing device 202 to store the contents of the local media library 204 in a user media file repository 262. The server system 230 can stream media files from the repository 262 and/or 264 to user devices that do not include the local media library 204 (user devices other than the mobile computing device 202). For instance, for media files that were not upgraded to higher quality versions, the media file may be stored in the user media file repository 262 and streamed or otherwise transferred to a user device from the repository 262. For media files that were upgraded, the corresponding master version may be streamed or otherwise transferred from the master media file repository 264.

FIG. 3 illustrates example variations in media content quality level. A determination of whether a first quality level of media content is higher than a second quality level of matching media content may consider the below described variations in media content quality.

A media content characteristic that may be used in determining media content quality level is length 302a of the media content. First media content may be determined to be of higher quality level than second media content if the first media content includes the content in the first media content, but also includes additional content. For example, in FIG. 3, the low quality level version of the media content 302b includes several verses (represented by the characters 'A,' 'C,' and 'D'), and a repeating chorus (represented by the character 'B'). The verses and characters may be identified by the media file fingerprint generator 232 of FIG. 2. As illustrated in FIG. 3, the same verses have been identified in the high quality level version of the media content 302c as were included in the low quality level version of the media content 302b, where the high quality level version of the media content 302c includes an additional verse (represented by the character 'E'). The high quality level version of the media content 302c includes the same chorus 'B', but the chorus 'B' is repeated an extra time between each verse. Accordingly, the server system described with reference to FIGS. 1 and 2 may determine that the high quality level version of media content 302c is of higher quality level than the low quality level version of media content 302b.

Another media content characteristic that may be used in determining media content quality level is metadata 304a. The metadata that accompanies media content (e.g., within the same media file) may be used to determine if the media content is of lesser or greater quality level than another version of the media content. In this example, the high quality level metadata 304c includes additional metadata (e.g., the artwork, lyrics, website, distributor, a cappella version, and instrumental version), and thus may be determined to be of a higher quality level than a version of the media content 304b that includes only the artist name, song name, and album name.

Another media content characteristic that may be used in determining media content quality level is bit rate 306a. Media content that has been encoded in a higher bit rate may be determined to be of higher quality level than similar media content encoded in a lower bit rate. In this example, the media content 306c with a bit rate of 192 kbps is determined to be of higher quality level than the media content 306b with a sbit rate of 128 kbps.

Another media content characteristic that may be used in determining media quality level is a codec or file type 308a. As described above, some codecs and file types may be predefined as being of higher quality level than other codecs. A comparison may be made between two variations in matching media content to determine if one of the media content is associated with a higher quality level codec than the other media content. In this example the "Codec A" 308b has been predefined to be of lower quality level than an uncompressed codec 308c. Accordingly, the media content that has been encoded with the uncompressed codec 308c is determined to be of higher quality level than the media content that was encoded with the "Codec A" 308b.

Another media content characteristic that may be used in determining media quality level includes defects 310a that have been identified in media content. Media content that has been identified as having fewer instances or total played length of defects may be determined to be of higher quality level than matching media content with more defects. In this example, the media content 310b includes multiple defects (illustrated by the vertical solid lines). The media content 310c does not include any defects, and thus is determined to be of higher quality level than the media content 310b.

As described above with reference to FIG. 1, a first variation of media content may be determined to be of a higher quality level than a second variation of matching media content in some, but not all, characteristics. In such instances, two master media files may be stored at the server system, at least until media content that is of a higher quality level in all measured characteristics than the two master media files is uploaded. In some examples, a subset or a single one of the characteristics that are illustrated in FIG. 3 are used in a determination of media content quality level.

Referring now to FIG. 4, a conceptual diagram of a system that may be used to implement the systems and methods described in this document is illustrated. Mobile computing device 410 can wirelessly communicate with base station 440, which can provide the mobile computing device wireless access to numerous services 460 through a network 450.

In this illustration, the mobile computing device 410 is depicted as a handheld mobile telephone (e.g., a smartphone or an application telephone) that includes a touchscreen display device 412 for presenting content to a user of the mobile computing device 410. The mobile computing device 410 includes various input devices (e.g., keyboard 414 and touchscreen display device 412) for receiving user-input that influences the operation of the mobile computing device 410. In further implementations, the mobile computing device 410 may be a laptop computer, a tablet computer, a personal digital assistant, an embedded system (e.g., a car navigation system), a desktop computer, or a computerized workstation.

The mobile computing device 410 may include various visual, auditory, and tactile user-output mechanisms. An example visual output mechanism is display device 412, which can visually display video, graphics, images, and text that combine to provide a visible user interface. For example, the display device 412 may be a 3.7 inch AMOLED screen. Other visual output mechanisms may include LED status lights (e.g., a light that blinks when a voicemail has been received).

An example tactile output mechanism is a small electric motor that is connected to an unbalanced weight to provide a vibrating alert (e.g., to vibrate in order to alert a user of an incoming telephone call or confirm user contact with the touchscreen 412). Further, the mobile computing device 410 may include one or more speakers 420 that convert an electrical signal into sound, for example, music, an audible alert, or voice of an individual in a telephone call.

An example mechanism for receiving user-input includes keyboard 414, which may be a full qwerty keyboard or a traditional keypad that includes keys for the digits '0-9', '*' and '#.' The keyboard 414 receives input when a user physically contacts or depresses a keyboard key. User manipulation of a trackball 416 or interaction with a trackpad enables the user to supply directional and rate of rotation information to the mobile computing device 410 (e.g., to manipulate a position of a cursor on the display device 412).

The mobile computing device 410 may be able to determine a position of physical contact with the touchscreen display device 412 (e.g., a position of contact by a finger or a stylus). Using the touchscreen 412, various "virtual" input mechanisms may be produced, where a user interacts with a graphical user interface element depicted on the touchscreen 412 by contacting the graphical user interface element. An example of a "virtual" input mechanism is a "software keyboard," where a keyboard is displayed on the touchscreen and a user selects keys by pressing a region of the touchscreen 412 that corresponds to each key.

The mobile computing device 410 may include mechanical or touch sensitive buttons 418a-d. Additionally, the mobile computing device may include buttons for adjusting volume output by the one or more speakers 420, and a button for turning the mobile computing device on or off. A microphone 422 allows the mobile computing device 410 to convert audible sounds into an electrical signal that may be digitally encoded and stored in computer-readable memory, or transmitted to another computing device. The mobile computing device 410 may also include a digital compass, an accelerometer, proximity sensors, and ambient light sensors.

An operating system may provide an interface between the mobile computing device's hardware (e.g., the input/output mechanisms and a processor executing instructions retrieved from computer-readable medium) and software. Example operating systems include the ANDROID mobile device platform; APPLE IPHONE/MAC OS X operating systems; MICROSOFT WINDOWS 7/WINDOWS MOBILE operating systems; SYMBIAN operating system; RIM BLACKBERRY operating system; PALM WEB operating system; a variety of UNIX-flavored operating systems; or a proprietary operating system for computerized devices. The operating system may provide a platform for the execution of application programs that facilitate interaction between the computing device and a user.

The mobile computing device 410 may present a graphical user interface with the touchscreen 412. A graphical user interface is a collection of one or more graphical interface elements and may be static (e.g., the display appears to remain the same over a period of time), or may be dynamic (e.g., the graphical user interface includes graphical interface elements that animate without user input).

A graphical interface element may be text, lines, shapes, images, or combinations thereof. For example, a graphical interface element may be an icon that is displayed on the desktop and the icon's associated text. In some examples, a graphical interface element is selectable with user-input. For example, a user may select a graphical interface element by pressing a region of the touchscreen that corresponds to a display of the graphical interface element. In some examples, the user may manipulate a trackball to highlight a single graphical interface element as having focus. User-selection of a graphical interface element may invoke a pre-defined action by the mobile computing device. In some examples, selectable graphical interface elements further or alternatively correspond to a button on the keyboard 404. User-selection of the button may invoke the pre-defined action.

In some examples, the operating system provides a "desktop" user interface that is displayed upon turning on the mobile computing device 410, activating the mobile computing device 410 from a sleep state, upon "unlocking" the mobile computing device 410, or upon receiving user-selection of the "home" button 418*c*. The desktop graphical interface may display several icons that, when selected with user-input, invoke corresponding application programs. An invoked application program may present a graphical interface that replaces the desktop graphical interface until the application program terminates or is hidden from view.

User-input may manipulate a sequence of mobile computing device 410 operations. For example, a single-action user input (e.g., a single tap of the touchscreen, swipe across the touchscreen, contact with a button, or combination of these at a same time) may invoke an operation that changes a display of the user interface. Without the user-input, the user interface may not have changed at a particular time. For example, a multi-touch user input with the touchscreen 412 may invoke a mapping application to "zoom-in" on a location, even though the mapping application may have by default zoomed-in after several seconds.

The desktop graphical interface can also display "widgets." A widget is one or more graphical interface elements that are associated with an application program that has been executed, and that display on the desktop content controlled by the executing application program. A widget's application program may start with the mobile telephone. Further, a widget may not take focus of the full display. Instead, a widget may only "own" a small portion of the desktop, displaying content and receiving touchscreen user-input within the portion of the desktop.

The mobile computing device 410 may include one or more location-identification mechanisms. A location-identification mechanism may include a collection of hardware and software that provides the operating system and application programs an estimate of the mobile telephone's geographical position. A location-identification mechanism may employ satellite-based positioning techniques, base station transmitting antenna identification, multiple base station triangulation, internet access point IP location determinations, inferential identification of a user's position based on search engine queries, and user-supplied identification of location (e.g., by "checking in" to a location).

The mobile computing device 410 may include other application modules and hardware. A call handling unit may receive an indication of an incoming telephone call and provide a user the capabilities to answer the incoming telephone call. A media player may allow a user to listen to music or play movies that are stored in local memory of the mobile computing device 410. The mobile computing device 410 may include a digital camera sensor, and corresponding image and video capture and editing software. An internet browser may enable the user to view content from a web page by typing in an addresses corresponding to the web page or selecting a link to the web page.

The mobile computing device 410 may include an antenna to wirelessly communicate information with the base station 440. The base station 440 may be one of many base stations in a collection of base stations (e.g., a mobile telephone cellular network) that enables the mobile computing device 410 to maintain communication with a network 450 as the mobile computing device is geographically moved. The computing device 410 may alternatively or additionally communicate with the network 450 through a Wi-Fi router or a wired connection (e.g., Ethernet, USB, or FIREWIRE). The computing device 410 may also wirelessly communicate with other computing devices using BLUETOOTH protocols, or may employ an ad-hoc wireless network.

A service provider that operates the network of base stations may connect the mobile computing device 410 to the network 450 to enable communication between the mobile computing device 410 and other computerized devices that provide services 460. Although the services 460 may be provided over different networks (e.g., the service provider's internal network, the Public Switched Telephone Network, and the Internet), network 450 is illustrated as a single network. The service provider may operate a server system 452 that routes information packets and voice data between the mobile computing device 410 and computing devices associated with the services 460.

The network 450 may connect the mobile computing device 410 to the Public Switched Telephone Network (PSTN) 462 in order to establish voice or fax communication between the mobile computing device 410 and another computing device. For example, the service provider server system 452 may receive an indication from the PSTN 462 of an incoming call for the mobile computing device 410. Conversely, the mobile computing device 410 may send a communication to the service provider server system 452 initiating a telephone call with a telephone number that is associated with a device accessible through the PSTN 462.

The network 450 may connect the mobile computing device 410 with a Voice over Internet Protocol (VoIP) service 464 that routes voice communications over an IP network, as opposed to the PSTN. For example, a user of the mobile computing device 410 may invoke a VoIP application and initiate a call using the program. The service provider server system 452 may forward voice data from the call to a VoIP service, which may route the call over the internet to a corresponding computing device, potentially using the PSTN for a final leg of the connection.

An application store 466 may provide a user of the mobile computing device 410 the ability to browse a list of remotely stored application programs that the user may download over the network 450 and install on the mobile computing device 410. The application store 466 may serve as a repository of applications developed by third-party application developers. An application program that is installed on the mobile computing device 410 may be able to communicate over the network 450 with server systems that are designated for the application program. For example, a VoIP application program may be downloaded from the Application Store 466, enabling the user to communicate with the VoIP service 464.

The mobile computing device 410 may access content on the internet 468 through network 450. For example, a user of the mobile computing device 410 may invoke a web browser application that requests data from remote computing devices that are accessible at designated universal resource locations. In various examples, some of the services 460 are accessible over the internet.

The mobile computing device may communicate with a personal computer 470. For example, the personal computer 470 may be the home computer for a user of the mobile computing device 410. Thus, the user may be able to stream media from his personal computer 470. The user may also view the file structure of his personal computer 470, and transmit selected documents between the computerized devices.

A voice recognition service 472 may receive voice communication data recorded with the mobile computing device's microphone 422, and translate the voice communication into corresponding textual data. In some examples, the translated text is provided to a search engine as a web query, and responsive search engine search results are transmitted to the mobile computing device 410.

The mobile computing device 410 may communicate with a social network 474. The social network may include numerous members, some of which have agreed to be related as acquaintances. Application programs on the mobile computing device 410 may access the social network 474 to retrieve information based on the acquaintances of the user of the mobile computing device. For example, an "address book" application program may retrieve telephone numbers for the user's acquaintances. In various examples, content may be delivered to the mobile computing device 410 based on social network distances from the user to other members. For example, advertisement and news article content may be selected for the user based on a level of interaction with such content by members that are "close" to the user (e.g., members that are "friends" or "friends of friends").

The mobile computing device 410 may access a personal set of contacts 476 through network 450. Each contact may identify an individual and include information about that individual (e.g., a phone number, an email address, and a birthday). Because the set of contacts is hosted remotely to the mobile computing device 410, the user may access and maintain the contacts 476 across several devices as a common set of contacts.

The mobile computing device 410 may access cloud-based application programs 478. Cloud-computing provides application programs (e.g., a word processor or an email program) that are hosted remotely from the mobile computing device 410, and may be accessed by the device 410 using a web browser or a dedicated program. Example cloud-based application programs include GOOGLE DOCS word processor and spreadsheet service, GOOGLE GMAIL webmail service, and PICASA picture manager.

Mapping service 480 can provide the mobile computing device 410 with street maps, route planning information, and satellite images. An example mapping service is GOOGLE MAPS. The mapping service 480 may also receive queries and return location-specific results. For example, the mobile computing device 410 may send an estimated location of the mobile computing device and a user-entered query for "pizza places" to the mapping service 480. The mapping service 480 may return a street map with "markers" superimposed on the map that identify geographical locations of nearby "pizza places."

Turn-by-turn service 482 may provide the mobile computing device 410 with turn-by-turn directions to a user-supplied destination. For example, the turn-by-turn service 482 may stream to device 410 a street-level view of an estimated location of the device, along with data for providing audio commands and superimposing arrows that direct a user of the device 410 to the destination.

Various forms of streaming media 484 may be requested by the mobile computing device 410. For example, computing device 410 may request a stream for a pre-recorded video file, a live television program, or a live radio program. Example services that provide streaming media include YOUTUBE and PANDORA.

A micro-blogging service 486 may receive from the mobile computing device 410 a user-input post that does not identify recipients of the post. The micro-blogging service 486 may disseminate the post to other members of the micro-blogging service 486 that agreed to subscribe to the user.

A search engine 488 may receive user-entered textual or verbal queries from the mobile computing device 410, determine a set of internet-accessible documents that are responsive to the query, and provide to the device 410 information to display a list of search results for the responsive documents. In examples where a verbal query is received, the voice recognition service 472 may translate the received audio into a textual query that is sent to the search engine.

These and other services may be implemented in a server system 490. A server system may be a combination of hardware and software that provides a service or a set of services. For example, a set of physically separate and networked computerized devices may operate together as a logical server system unit to handle the operations necessary to offer a service to hundreds of individual computing devices.

In various implementations, operations that are performed "in response" to another operation (e.g., a determination or an identification) are not performed if the prior operation is unsuccessful (e.g., if the determination was not performed). Features in this document that are described with conditional language may describe implementations that are optional. In some examples, "transmitting" from a first device to a second device includes the first device placing data into a network for receipt by the second device, but may not include the second device receiving the data. Conversely, "receiving" from a first device may include receiving the data from a network, but may not include the first device transmitting the data.

Figure 5:
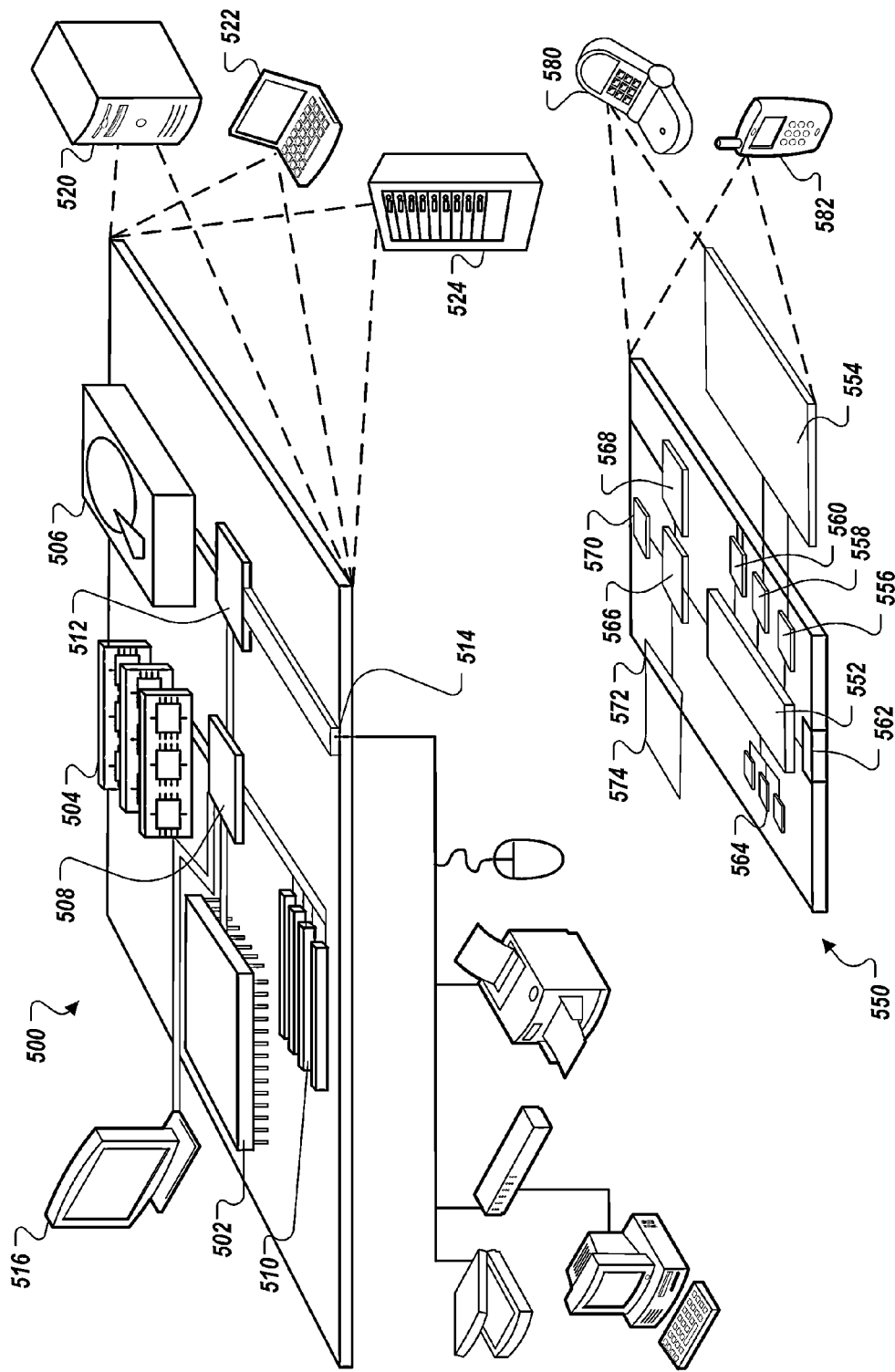
FIG. 5 is a block diagram showing examples of computing devices that may be used to implement the systems and methods described in this document, as either a client or as a server or plurality of servers.

FIG. 5 is a block diagram of computing devices 500, 550 that may be used to implement the systems and methods described in this document, as either a client or as a server or plurality of servers. Computing device 500 is intended to represent various forms of digital computers, such as laptops, desktops, workstations, personal digital assistants, servers, blade servers, mainframes, and other appropriate computers. Computing device 550 is intended to represent various forms of mobile devices, such as personal digital assistants, cellular telephones, smartphones, and other similar computing devices. Additionally computing device 500 or 550 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations described and/or claimed in this document.

Computing device 500 includes a processor 502, memory 504, a storage device 506, a high-speed interface connecting to memory 504 and high-speed expansion ports 510, and a low speed interface connecting to low speed bus 514 and storage device 506. Each of the components 502, 504, 506, 508, 510, and 512, are interconnected using various busses, and may be mounted on a common motherboard or in other manners as appropriate. The processor 502 can process instructions for execution within the computing device 500, including instructions stored in the memory 504 or on the storage device 506 to display graphical information for a GUI on an external input/output device, such as display 516 coupled to a high speed interface. In other implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 504, the storage device 506, or memory on processor 502.

The high speed controller 508 manages bandwidth-intensive operations for the computing device 500, while the low speed controller 512 manages lower bandwidth-intensive operations. Such allocation of functions is exemplary only. In one implementation, the high-speed controller 508 is coupled to memory 504, display 516 (e.g., through a graphics processor or accelerator), and to high-speed expansion ports 510, which may accept various expansion cards (not shown). In the implementation, low-speed controller 512 is coupled to storage device 506 and low-speed expansion port 514. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 520, or multiple times in a group of such servers. It may also be implemented as part of a rack server system 524. In addition, it may be implemented in a personal computer such as a laptop computer 522. Alternatively, components from computing device 500 may be combined with other components in a mobile device (not shown), such as device 550. Each of such devices may contain one or more of computing device 500, 550, and an entire system may be made up of multiple computing devices 500, 550 communicating with each other.

Computing device 550 includes a processor 552, memory 564, an input/output device such as a display 554, a communication interface 566, and a transceiver 568, among other components. The device 550 may also be provided with a storage device, such as a microdrive or other device, to provide additional storage. Each of the components 550, 552, 564, 554, 566, and 568, are interconnected using various buses, and several of the components may be mounted on a common motherboard or in other manners as appropriate.

The processor 552 can execute instructions within the computing device 550, including instructions stored in the memory 564. The processor may be implemented as a chipset of chips that include separate and multiple analog and digital processors. Additionally, the processor may be implemented using any of a number of architectures. For example, the processor 552 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 550, such as control of user interfaces, applications run by device 550, and wireless communication by device 550.

Processor 552 may communicate with a user through control interface 558 and display interface 556 coupled to a display 554. The display 554 may be, for example, a TFT (Thin-Film-Transistor Liquid Crystal Display) display or an OLED (Organic Light Emitting Diode) display, or other appropriate display technology. The display interface 556 may comprise appropriate circuitry for driving the display 554 to present graphical and other information to a user. The control interface 558 may receive commands from a user and convert them for submission to the processor 552. In addition, an external interface 562 may be provide in communication with processor 552, so as to enable near area communication of device 550 with other devices. External interface 562 may provide, for example, for wired communication in some implementations, or for wireless communication in other implementations, and multiple interfaces may also be used.

The memory 564 stores information within the computing device 550. The memory 564 can be implemented as one or more of a computer-readable medium or media, a volatile memory unit or units, or a non-volatile memory unit or units. Expansion memory 574 may also be provided and connected to device 550 through expansion interface 572, which may include, for example, a SIMM (Single In Line Memory Module) card interface. Such expansion memory 574 may provide extra storage space for device 550, or may also store applications or other information for device 550. Specifically, expansion memory 574 may include instructions to carry out or supplement the processes described above, and may include secure information also. Thus, for example, expansion memory 574 may be provide as a security module for device 550, and may be programmed with instructions that permit secure use of device 550. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 564, expansion memory 574, or memory on processor 552 that may be received, for example, over transceiver 568 or external interface 562.

Device 550 may communicate wirelessly through communication interface 566, which may include digital signal processing circuitry where necessary. Communication interface 566 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 568. In addition, short-range communication may occur, such as using a Bluetooth, WiFi, or other such transceiver (not shown). In addition, GPS (Global Positioning System) receiver module 570 may provide additional navigation- and location-related wireless data to device 550, which may be used as appropriate by applications running on device 550.

Device 550 may also communicate audibly using audio codec 560, which may receive spoken information from a user and convert it to usable digital information. Audio codec 560 may likewise generate audible sound for a user, such as through a speaker, e.g., in a handset of device 550. Such sound may include sound from voice telephone calls, may include recorded sound (e.g., voice messages, music files, etc.) and may also include sound generated by applications operating on device 550.

The computing device 550 may be implemented in a number of different forms, as shown in the figure. For example, it may be implemented as a cellular telephone 580. It may also be implemented as part of a smartphone 582, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. Moreover, other mechanisms for performing the systems and methods described in this document may be used. In addition, the logic flows depicted in the figures do not require the particular order shown, or sequential order, to achieve desirable results. Other steps may be provided, or steps may be eliminated, from the described flows, and other components may be added to, or removed from, the described systems. Accordingly, other implementations are within the scope of the following claims.

What is claimed is:

1. A computer-implemented method comprising:
storing, at a server system, a master media file, the master media file containing content at a first quality level;
accessing, by the server system, characteristic data that indicates characteristics of multiple media files that are stored for a user on a user device, wherein the characteristic data is generated based on a scan of the multiple media files that was conducted to determine media files to be associated with a media library stored at the server system for the user, the scan being conducted prior to the multiple media files being associated with the media library, wherein the media library is a subset of all media files made available by the server, and the subset being media files for which the user has a right to access;
as a result of the scan, associating, at the server system, the multiple media files with the media library;
determining, at the server system and based on the characteristic data, that at least one of the multiple media files is a matching media file that includes content matching the content contained in the master media file;
determining, at the server system, that the content contained in the matching media file is of a second quality level that is lower than the first quality level of the content contained in the master media file;
determining if the user has provided payment for access to the master media file;
if the user has provided payment for access to the master media file, associating the master media file with the media library and providing the user with access to the master media file stored at the server system;
receiving, after associating the multiple media files with the media library, a request from a second user device to receive at least one of the multiple media files associated with the media library;
determining that the user of the second user device is the user of the user device; and
in response to determining that the user of the second user device is the user of the user device,
transmitting the at least one of the multiple media files from the server system to the second user device, and
storing, at the second user device, the at least one of the multiple media files.

2. The method of claim 1 wherein providing the user with access to the master media file stored at the server system comprises receiving, at the server system, a request from the user device to download the master media file to the user device and, in response to receiving the request, sending the master media file to the user device.

3. The method of claim 1 wherein providing the user with access to the master media file stored at the server system comprises receiving, at the server system, a request from the user device to stream the master media file to the user device and, in response to receiving the request, streaming the master media file to the user device.

4. The method of claim 1 wherein determining if the user has provided payment for access to the master media file comprises determining if the user has provided payment as part of a subscription that provides access to master media files.

5. The method of claim 1 further comprising, in response to determining that the content contained in the matching media file is of a second quality level that is lower than the first quality level of the content contained in the master media file, causing the user device to display a prompt to the user, the prompt soliciting the user for payment to receive access to the master media file.

6. The method of claim 1 wherein the accessed characteristic data was generated by the user device.

7. The method of claim 1, wherein the accessed characteristic data includes acoustic fingerprints of the multiple media files, wherein an acoustic fingerprint is a digital summary of a media file that has been deterministically generated from an audio signal that is stored within the media file.

8. The method of claim 7, wherein determining that at least one of the multiple media files is a matching media file includes determining that an acoustic fingerprint of the matching media file matches an acoustic fingerprint of the master media file.

9. The method of claim 1, wherein the accessed characteristic data was generated by the server system.

10. The method of claim 1, wherein the accessed characteristic data includes metadata that specifies information for the multiple media files.

11. The method of claim 10 wherein the information includes one or more of title, artist, album or bit rate.

12. The method of claim 1, wherein determining that the content contained in the matching media file is of a second quality level that is lower than the first quality level of the content contained in the master media file includes determining that the matching media file encodes an audio signal at a lower bit rate than the master media file.

13. The method of claim 1, wherein determining that the content contained in the matching media file is of a second quality level that is lower than the first quality level of the content contained in the master media file includes determining that the matching media file encodes an audio signal at a same bit rate as the master media file but that the master media file includes fewer defects in the audio signal that are caused during an encoding process for the audio signal than the matching media file.

14. The method of claim 1, wherein determining that the content contained in the matching media file is of a second quality level that is lower than the first quality level of the content contained in the master media file includes determining that the master media file is a longer length version of the matching media file.

15. A system comprising:
a user device storing multiple media files for a user;
a second user device storing multiple media files for the user;
a server system configured to:
store a master media file, the master media file containing content at a first quality level;
access characteristic data that indicates characteristics of the multiple media files, wherein the characteristic data is generated based on a scan of the multiple media files that was conducted to determine media files to be associated with a media library stored at the server system for the user, the scan being conducted prior to the multiple media files being associated with the media library, wherein the media library is a subset of all media files made available by the server, and the subset being media files for which the user has a right to access;
as a result of the scan, associate the multiple media files with the media library;
determine, based on the characteristic data, that at least one of the multiple media files is a matching media file that includes content matching the content contained in the master media file;
determine that the content contained in the matching media file is of a second quality level that is lower than the first quality level of the content contained in the master media file;
determine if the user has provided payment for access to the master media file;
if the user has provided payment for access to the master media file, associate the master media file with the media library and providing the user with access to the master media file stored at the server system;
receiving, after associating the multiple media files with the media library, a request from the second user device to receive at least one of the multiple media files associated with the media library;
determining that the user of the second user device is the user of the user device; and
in response to determining that the user of the second user device is the user of the user device, transmitting the at least one of the multiple media files from the server system to the second user device;
the second user device configured to store the at least one of the multiple media files.

16. The system of claim 15 wherein, to determine if the user has provided payment for access to the master media file, the server system is configured to determine if the user has provided payment as part of a subscription that provides access to master media files.

17. The system of claim 15 wherein the server system is further configured to, in response to determining that the content contained in the matching media file is of a second quality level that is lower than the first quality level of the content contained in the master media file, cause the user device to display a prompt to the user, the prompt soliciting the user for payment to receive access to the master media file.

18. A system comprising:
one or more processing devices; and
a computer readable medium storing instructions that, when executed by the one or more processing devices, cause the one or more processing devices to:
store, at a server system, a master media file, the master media file containing content at a first quality level;
access, by the server system, characteristic data that indicates characteristics of multiple media files that are stored for a user on a user device, wherein the characteristic data is generated based on a scan of the multiple media files that was conducted to determine media files to be associated with a media library stored at the server system for the user, the scan being conducted prior to the multiple media files being associated with the media library, wherein the media library is a subset of all media files made available by the server, and the subset being media files for which the user has a right to access;

as a result of the scan, associate, at the server system, the multiple media files with the media library;

determine, at the server system and based on the characteristic data, that at least one of the multiple media files is a matching media file that includes content matching the content contained in the master media file;

determine, at the server system, that the content contained in the matching media file is of a second quality level that is lower than the first quality level of the content contained in the master media file;

determine if the user has provided payment for access to the master media file;

if the user has provided payment for access to the master media file, associate the master media file with the media library and providing the user with access to the master media file stored at the server system;

receive, after associating the multiple media files with the media library, a request from a second user device to receive at least one of the multiple media files associated with the media library;

determine that the user of the second user device is the user of the user device; and in response to determining that the user of the second user device is the user of the user device, transmit the at least one of the multiple media files from the server system to the second user device, and store, at the second user device, the at least one of the multiple media files.

19. The system of claim 18 wherein, to determine if the user has provided payment for access to the master media file, the instructions include instructions that cause the one or more processing devices to determine if the user has provided payment as part of a subscription that provides access to master media files.

20. The system of claim 18 wherein the instructions include instructions that cause the one or more processing devices to, in response to determining that the content contained in the matching media file is of a second quality level that is lower than the first quality level of the content contained in the master media file, cause the user device to display a prompt to the user, the prompt soliciting the user for payment to receive access to the master media file.

21. The method of claim 1, further comprising:
receiving, after associating the multiple media files with the media library, a request from the user device to receive at least one of the multiple media files associated with the media library;
in response to receiving the request, transmitting the at least one of the multiple media files from the server system to the user device.

22. The method of claim 6, wherein the scan is conducted at a regularly scheduled time without a prompt by the user.

23. The method of claim 6, wherein the scan is conducted by an application program hosted locally on the user device, and the application program is initiated by the user.

24. The system of claim 15 wherein the server system is further configured to:
receive, after associating the multiple media files with the media library, a request from the user device to receive at least one of the multiple media files associated with the media library;
in response to receiving the request, transmit the at least one of the multiple media files from the server system to the user device.

* * * * *